J. C. VAN AKEN.
SLED.
APPLICATION FILED NOV. 19, 1914.
1,177,155.
Patented Mar. 28, 1916.
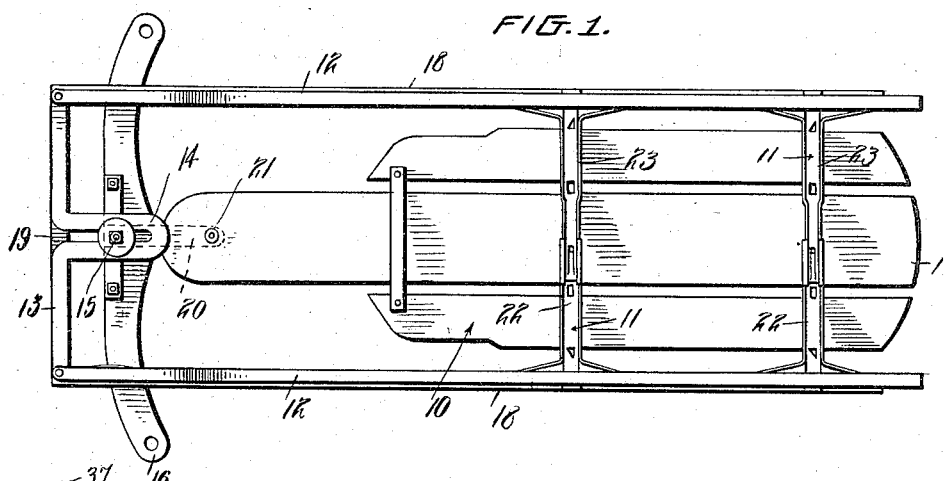
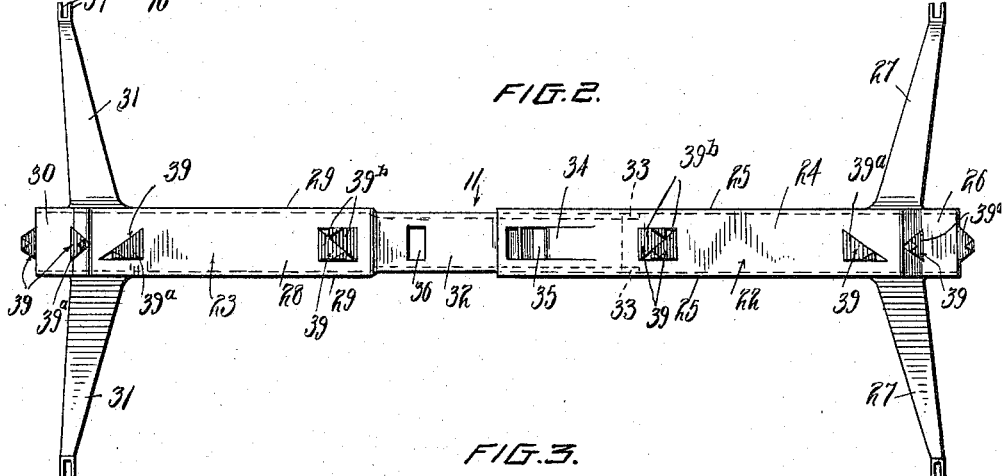
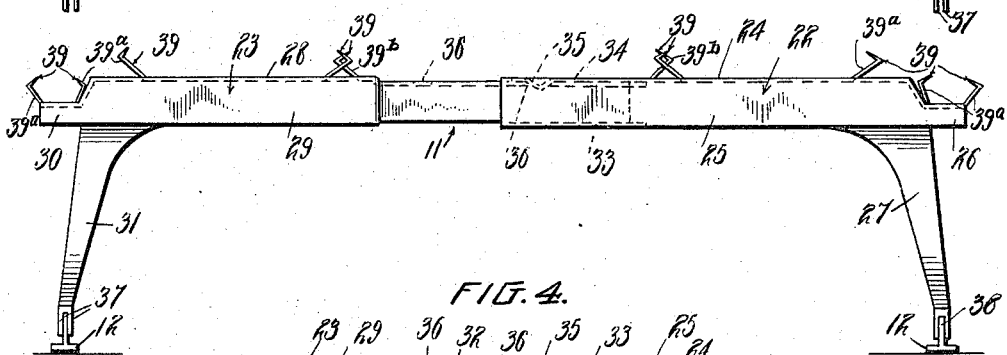

UNITED STATES PATENT OFFICE.

JOHN C. VAN AKEN, OF RIDGEWAY, PENNSYLVANIA.

SLED.

1,177,155.      Specification of Letters Patent.      Patented Mar. 28, 1916.

Application filed November 19, 1914. Serial No. 872,995.

*To all whom it may concern:*

Be it known that I, JOHN C. VAN AKEN, a citizen of the United States, residing at Ridgeway, in the county of Elk and State of Pennsylvania, have invented or discovered certain new and useful Improvements in Sleds, of which the following is a specification, reference being had therein to the accompanying drawings.

This invention relates to frames of toy or hand sleds and has for its objects to provide a simple and inexpensive metallic sled frame construction which will possess the necessary strength and rigidity for its intended purpose and which will permit the assembling of the sled without the use of bolts, rivets or other fastening devices for the attachment of the wooden parts of the sled to the metallic frame thereof, and also to provide a combined cross brace and runner support adapted for use, without modification, in the frames of sleds of different widths, thereby providing for a standardization and interchangeability of parts in manufacture and use.

The foregoing and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention may be otherwise embodied and practised without departing from the spirit and scope thereof as defined by the claims hereunto appended.

In said drawings: Figure 1 is a bottom plan view of a sled having a frame constructed in accordance with the invention. Fig. 2 is a top plan view on an enlarged scale, and Fig. 3 an elevation on a similar scale, of one of the combined cross braces and runner supports. Fig. 4 is a fragmentary bottom plan view of the joint connecting the two portions of the cross brace.

For convenience the invention is herein shown as embodied in a sled of the general type shown and described in Letters Patent No. 1,040,061, granted to me Oct. 1, 1912, although, as will be seen, the parts forming the subject matter of the present invention are in no wise limited, as to their utility, to sleds of this or any other particular type.

As shown in Fig. 1, said sled comprises a top or body, designated as a whole by the numeral 10, supported by frame members, designated as a whole by the numeral 11, from runners 12 which are preferably constructed of steel bars substantially T-shaped in cross section, as shown in Fig. 3. The runners 12 are connected at their upwardly turned forward ends by a cross bar 13 pivoted at its ends to said runners. Intermediate its ends said cross bar 13 is bent rearwardly to form an elongated U-shaped extension 14 with which coöperates a bolt 15 projecting downwardly from the steering bar 16. The top or body comprises a platform 17 and a frame composed of side bars 18, above and normally parallel to the runners 12, and connected by a cross piece 19 immediately above and parallel to the bar 13. The steering bar 16 is connected with the platform 17 by means of a link 20 rigidly secured to said steering bar and pivoted at 21 to said platform. Turning of the steering bar 16 about the pivot 21 operates, through the bolt 15, extension 14, and bar 13, to flex the runners 12 laterally for the purpose of steering the sled.

Each of the frame members 11, which constitute the subject matter of the present invention, preferably comprises two portions or sections, designated as a whole by the numerals 22 and 23, respectively, each composed of sheet metal bent into the required form, as will now be described.

The member 22 comprises a top or supporting portion 24 provided with depending side flanges 25, an end extension 26 depressed slightly below the top 24, and a pair of supporting legs 27. Similarly the section 23 comprises a top 28 provided with side flanges 29, a depressed end extension 30, and a pair of supporting legs 31.

The top portion 28 of the section 23 is formed with a reduced end or extension 32 which is telescopically received within the end of the top portion 24 of the section 22, being guided and supported therein between the side flanges 25 and resting upon inturned portions 33 at the lower edges of said side flanges. When so connected, the top portions 24 and 28 of the sections 22 and 23 collectively form a cross brace upon which the platform 17 is supported, while the end extensions 26 and 30 form supports for the side bars 18 of the sled top.

The top portion 24 of the section 22 is provided with a resilient locking tongue 34, preferably formed integral with said top portion by being stamped or struck out from the metal thereof, as shown in Fig. 2. The tongue 34 is bent at its end to form an angular locking portion 35 adapted to engage any one of a series of openings 36 in the reduced end 32 of the top portion 28 of the section 23, thereby locking the sections 22 and 23 together. As herein shown two openings 36 are provided in the extension 32, although any other suitable number may be provided as desired or in accordance with the requirements. By engaging the angular end 35 of the locking tongue 34 with one or another of the openings 36 it will be seen that the length of the frame member 11 may be varied in accordance with the width of the sled in which the same is used.

By forming the locking end 35 of the tongue 34 of the angular shape shown it will be seen that the two sections of the frame member may be forced together or pulled apart to any desired position of adjustment, the resilient tongue 34 yielding to permit the locking end 35 thereof to enter or leave the openings 36 and to ride over the surface of the end 32 between said openings. When, however, the sled is fully assembled, and the platform 17 secured to the cross braces formed by the portions 24 and 28 of the frame member 11, engagement of the boards or slats, forming parts of said platform, with the locking tongues 34 will hold the locking ends 35 thereof in locked engagement with the desired openings 36, thereby permanently connecting the sections 22 and 23 of said frame members.

The legs 27 and 31 may be of any suitable form and dimensions and are bifurcated at their ends to form ears 37 which embrace and are secured, as by rivets, to the upstanding flanges 38 of the runners 12.

The top portions 24 and 28 and the end extensions 26 and 30 of the sections 22 and 23 are provided with integral struck up prongs 39, preferably formed by stamping out triangular portions of the metal, as shown, said prongs constituting permanently associated means for attaching the slats forming the platform 17, as well as the side bars 18 of the top frame, to the frame member 11. The prongs 39 may be of any suitable number and arrangement according to the requirements, certain of said prongs being preferably formed singly, as indicated at 39ª in Fig. 2, and others in overlapping pairs, as indicated at 39ᵇ in the same figure, the prongs 39ᵇ of each pair being adapted to engage adjacent slats, respectively. Said prongs serve as an efficient means for securing together the top and frame members of the sled without the use of rivets, nails, screws or the like, thereby eliminating the cost of such fastening devices as well as the time and labor of forming the necessary openings in the members and inserting such securing devices in assembling the parts of the sled.

Having thus described my invention, I claim:

1. In a sled, a metallic frame member provided with permanently associated attaching prongs comprising integral, struck up, triangular portions of the metal of said member, said prongs being arranged in overlapping pairs.

2. In a sled, a combined cross brace and runner support arranged transversely of said sled, adjustable in length, and provided with permanently associated means for securing the sled top thereto.

3. A sled comprising, in combination, a top, runners, and frame members connecting said top and runners, said frame members each comprising a cross brace extending transversely of said top and secured thereto and supporting legs extending from said cross brace and secured to said runners, said cross braces being adjustable in length.

4. In a sled, a top supporting cross brace comprising two portions, one of said portions having side flanges provided with inturned lower edges, and the other of said portions having a reduced end telescopically received between the side flanges of said first named portion.

5. In a sled, a top supporting cross brace comprising two telescoping portions and means to lock said portions together in adjusted position.

6. In a sled, a top supporting cross brace comprising two telescoping portions, one of said portions having a series of openings and the other of said portions having an integral spring tongue coöperating with said openings to lock said portions together in adjusted position.

7. In a sled, a top supporting cross brace comprising two portions, one of said portions having side flanges, and the other of said portions having a reduced end telescopically received between said side flanges and provided with a series of openings, said first named portion having an integral spring tongue coöperating with said openings to lock said portions together.

8. In a sled, the combination with a cross brace comprising two telescoping portions and means for locking said portions together, of a top secured to said cross brace, said top engaging said locking means and holding the same in locking position.

9. In a sled, the combination with a cross brace comprising two telescoping portions, one of said portions having a series of openings and the other of said portions having an integral spring tongue coöperating with said openings to lock said portions together, of a top secured to said cross brace, said top engaging said tongue and holding the same with its end in locking engagement with the adjacent opening.

10. In a sled, in combination, a top, a pair of runners, and metallic frame members connecting said top and runners, said frame members each comprising a cross brace extending transversely of said top and supporting legs extending from said cross brace and secured to said runners, said cross braces being provided with integral, struck up attaching prongs for securing said top thereto, and each of said cross braces comprising two portions, one of said portions having side flanges, and the other of said portions having a reduced end telescopically received between said side flanges and provided with a series of openings, said first named portion having an integral spring tongue coöperating with said openings to lock said portions together, said tongue being engaged by said top, when said top is secured in place by said attaching prongs, and held thereby with its end in locking engagement with the adjacent opening.

In testimony whereof I affix my signature, in presence of two witnesses.

JOHN C. VAN AKEN.

Witnesses:
HENRY E. VAN AKEN,
H. HILTON.

Copies of this patent may be obtained for five cents each, by addressing the "Commissioner of Patents, Washington, D. C."